US008371810B2

(12) United States Patent
Roberts, III

(10) Patent No.: US 8,371,810 B2

(45) Date of Patent: Feb. 12, 2013

(54) DUCT MEMBER BASED NOZZLE FOR TURBINE

(75) Inventor: Herbert Chidsey Roberts, III, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 828 days.

(21) Appl. No.: 12/411,622

(22) Filed: Mar. 26, 2009

(65) Prior Publication Data

US 2010/0247303 A1 Sep. 30, 2010

(51) Int. Cl.

| | |
|---|---|
| ***F03D 11/00*** | (2006.01) |
| ***F03D 1/04*** | (2006.01) |
| ***F03D 3/04*** | (2006.01) |
| ***F01D 1/02*** | (2006.01) |
| ***F03B 1/04*** | (2006.01) |
| ***F03B 3/16*** | (2006.01) |
| ***F04D 29/44*** | (2006.01) |
| ***F04D 29/54*** | (2006.01) |

(52) U.S. Cl. ..................................... 415/191; 415/211.2

(58) Field of Classification Search .................. 415/191, 415/211.1, 202

See application file for complete search history.

(56) References Cited

U.S. PATENT DOCUMENTS

| | | | |
|---|---|---|---|
| 3,781,125 | A | 12/1973 | Rahaim et al. |
| 4,015,910 | A | 4/1977 | Harmon et al. |
| 4,147,029 | A | 4/1979 | Sargisson |
| 4,396,349 | A | 8/1983 | Hueber |
| 4,446,693 | A | 5/1984 | Pidcock et al. |
| 4,492,517 | A | 1/1985 | Klompas |
| 4,946,346 | A | 8/1990 | Ito |
| 4,991,496 | A | 2/1991 | Kuno et al. |
| 5,018,941 | A | 5/1991 | Heurtel et al. |
| 5,129,699 | A | 7/1992 | De Angeli |
| 5,141,395 | A | 8/1992 | Carroll et al. |
| 5,184,459 | A | 2/1993 | McAndrews |
| 5,252,026 | A | 10/1993 | Shepherd |
| 5,343,694 | A | 9/1994 | Toborg et al. |
| 5,399,067 | A | 3/1995 | Yoshida |
| 5,528,904 | A | 6/1996 | Jones et al. |
| 5,591,003 | A | 1/1997 | Boyd et al. |
| 5,618,161 | A | 4/1997 | Papageorgiou et al. |
| 5,752,804 | A | 5/1998 | Benoist et al. |
| 5,861,585 | A | 1/1999 | Van Every et al. |
| 5,876,659 | A | 3/1999 | Yasutomi et al. |
| 6,050,776 | A | 4/2000 | Akagi et al. |
| 6,135,878 | A | 10/2000 | Felsen |
| 6,165,605 | A | 12/2000 | Fujita et al. |
| 6,270,401 | B1 | 8/2001 | Wormmeester |
| 6,287,091 | B1 | 9/2001 | Svihla et al. |
| 6,343,912 | B1 | 2/2002 | Manteiga et al. |
| 6,585,151 | B1 | 7/2003 | Ghosh |
| 6,592,326 | B2 | 7/2003 | Marx et al. |

(Continued)

FOREIGN PATENT DOCUMENTS

| | | | |
|---|---|---|---|
| EP | 0903467 | A3 | 3/1999 |
| EP | 0949404 | A1 | 10/1999 |

(Continued)

*Primary Examiner* — Chuong A Luu
*Assistant Examiner* — Nga Doan
(74) *Attorney, Agent, or Firm* — Ernest G. Cusick; Hoffman Warnick LLC

(57) ABSTRACT

A nozzle for a turbine includes a duct member having a substantially uniform wall thickness. Nozzles made of different materials can be used.

20 Claims, 5 Drawing Sheets

U.S. PATENT DOCUMENTS

| | | | |
|---|---|---|---|
| 6,657,364 | B1 | 12/2003 | Takeuchi et al. |
| 6,709,230 | B2 | 3/2004 | Morrison et al. |
| D496,992 | S | 10/2004 | Lafond |
| 6,843,479 | B2 | 1/2005 | Burdgick |
| 7,093,359 | B2 | 8/2006 | Morrison et al. |
| 7,101,150 | B2 | 9/2006 | Bash et al. |
| 7,108,479 | B2 | 9/2006 | Beverley et al. |
| 7,138,190 | B2 | 11/2006 | Bauer et al. |
| 7,217,088 | B2 | 5/2007 | Albrecht et al. |
| 7,303,372 | B2 | 12/2007 | West et al. |
| 7,387,758 | B2 | 6/2008 | Merrill et al. |
| 2003/0223861 | A1 | 12/2003 | Morrison et al. |
| 2006/0171809 | A1 * | 8/2006 | Albrecht et al. ............ 416/97 R |
| 2007/0116562 | A1 * | 5/2007 | West et al. ................. 415/208.1 |

FOREIGN PATENT DOCUMENTS

| | | | |
|---|---|---|---|
| EP | 1106784 | B1 | 12/2000 |
| EP | 1106784 | B1 | 6/2006 |
| EP | 1199440 | A3 | 11/2006 |
| EP | 1975373 | A1 * | 10/2008 |

* cited by examiner

DUCT MEMBER BASED NOZZLE FOR TURBINE

BACKGROUND OF THE INVENTION

The invention relates generally to turbine technology. More particularly, the invention relates to a nozzle including a duct member having substantially uniform wall thickness that replaces conventional airfoil nozzles for a turbine.

One goal of current turbine development is evaluating replacement of metal parts with composite matrix material (CMM) parts. During evaluation, usually a CMM part takes the place of one of the similarly structured metal parts, and the machine is tested. It is difficult, however, in some instances to replace a single metal part with a CMM part and operate the machine with both types of parts because the materials have fundamentally different physical characteristics, e.g., strength, elasticity, etc. In particular, use of the CMM part in some settings leads to machine failure. Another challenge is that evaluation of the applicability of a CMM part may require modification of the part, some times in place on a machine.

One turbine part that has been identified for evaluation for replacement by CMM parts are turbine nozzles or vanes, which are used to direct a gas flow to rotor buckets on a gas turbine. Each nozzle has an airfoil or blade shape configured such that when a set of the nozzles are positioned about a rotor of the turbine, they direct the gas flow in an optimal direction and with an optimal pressure against the rotor buckets. The metal nozzles have very specific physical characteristics in order to operate, and replacement of one metal nozzle with a CMM nozzle leads to machine failure. Consequently, meaningful evaluation of machine operation using a CMM nozzle in replacement of one metal nozzle in a set of metal nozzles is nearly impossible. Another challenge is that conventional nozzles are typically not readily accessible such that modifications can be easily made during evaluation, e.g., modification may require dismantling of the turbine and possibly removal of the nozzle.

BRIEF DESCRIPTION OF THE INVENTION

A first aspect of the disclosure provides a nozzle for a turbine, the nozzle comprising: a duct member having a substantially uniform wall thickness.

A second aspect of the disclosure provides a turbine comprising: a rotating shaft; a plurality of buckets extending from the rotating shaft; and a nozzle set adjacent to the plurality of buckets for directing a fluid flow to the plurality of buckets, each nozzle of the nozzle set including a duct member having a substantially uniform wall thickness.

DETAILED DESCRIPTION OF THE INVENTION

Figure 1:
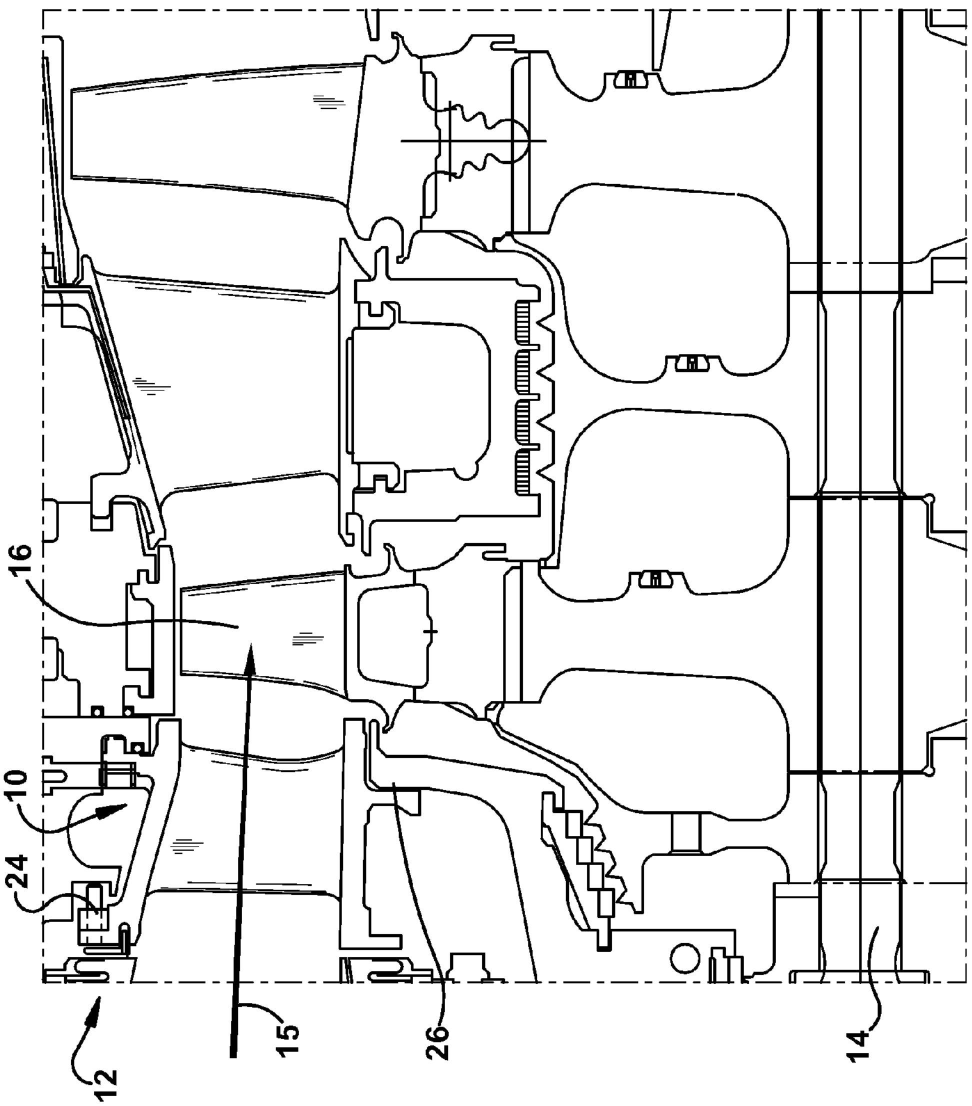
Fig. 1 (Prior Art)
FIG. 1 shows a cross-sectional view of a conventional turbine.
Figure 2:
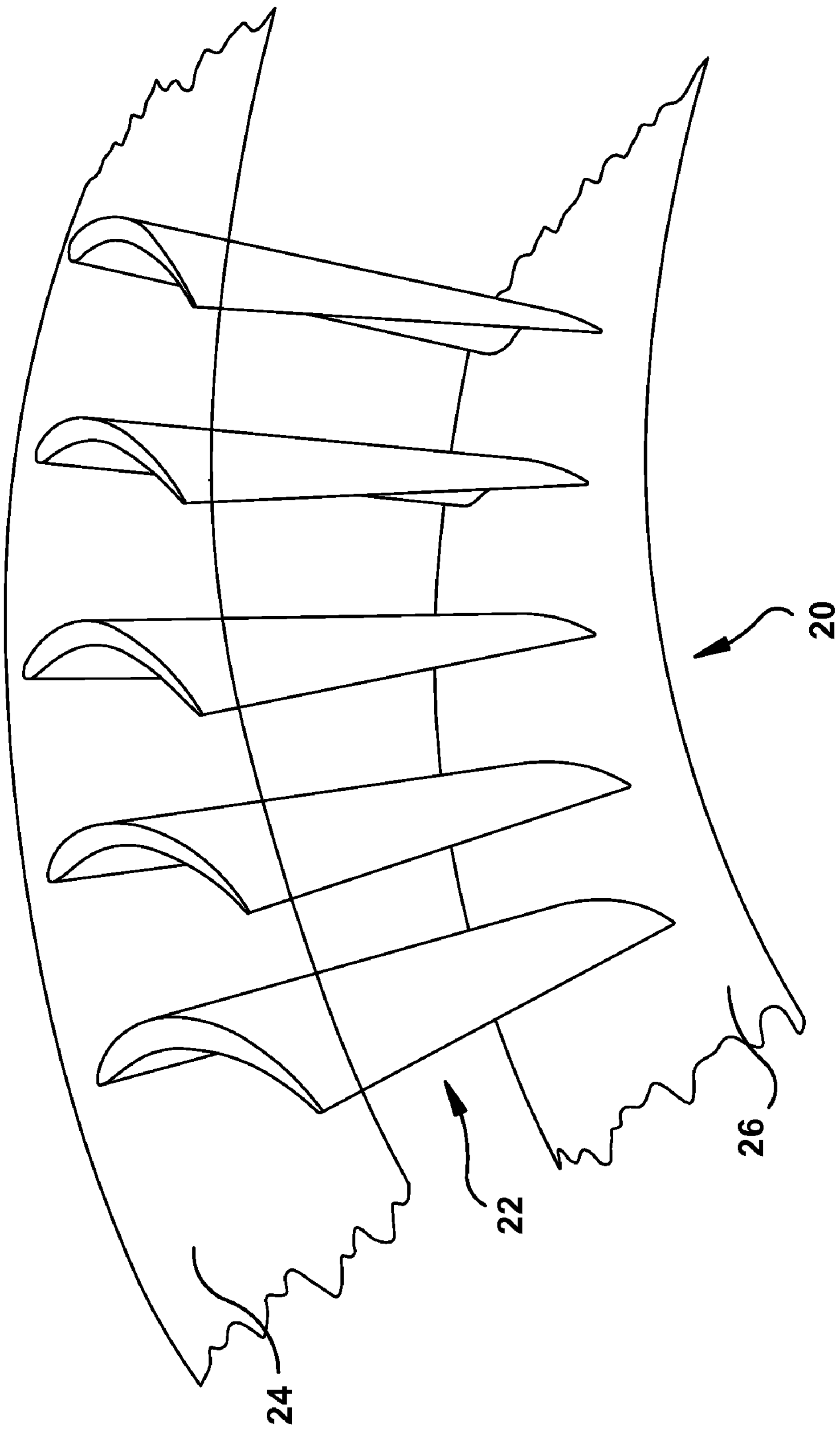
Fig. 2 (Prior Art)
FIG. 2 shows a perspective view of a portion of a conventional nozzle set.

Referring to the drawings, FIG. 1 shows a cross-sectional view of a portion of a conventional nozzle set 10 within a turbine 12. As understood, turbine 12 includes a rotor including a rotating shaft 14 having a plurality of buckets 16 extending therefrom at different stages. (Two sets are shown). Buckets 16 extend radially from rotating shaft 14 and, under the force of a fluid flow 15, act to rotate rotating shaft 14. A nozzle set 10 is positioned before each stage of plurality of buckets 16 to direct fluid flow 15 to the plurality of buckets with the appropriate angle of attack and pressure. As shown in FIG. 2, each nozzle 20 within a set includes an airfoil member 22 that is immovably coupled at a radially inner and radially outer end thereof to other rotor structure, i.e., a radially outer shroud 24 and a radially inner shroud 26. A space between nozzles 20 at radially inner shroud 26 is either non-existent because of mating airfoil surfaces or is provided by a plate portion of radially inner shroud 26. A space between nozzles 20 at radially outer shroud 24 may be provided by a plate portion of radially outer shroud 24.

Figure 3:
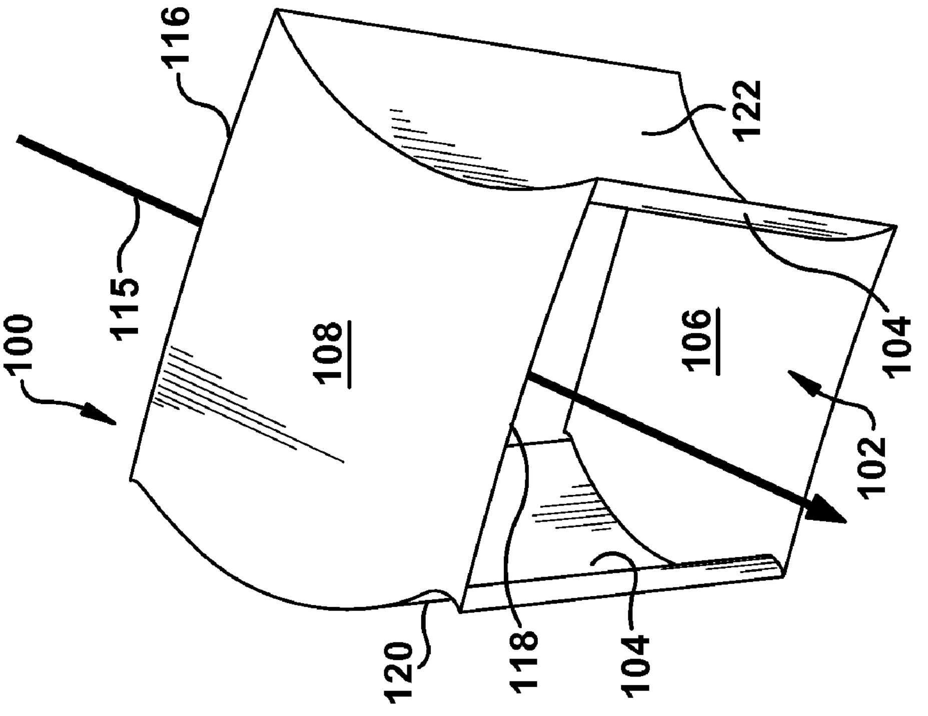
FIGS. 3 and 4 show perspective views of a nozzle according to embodiments of the disclosure.
Figure 4:
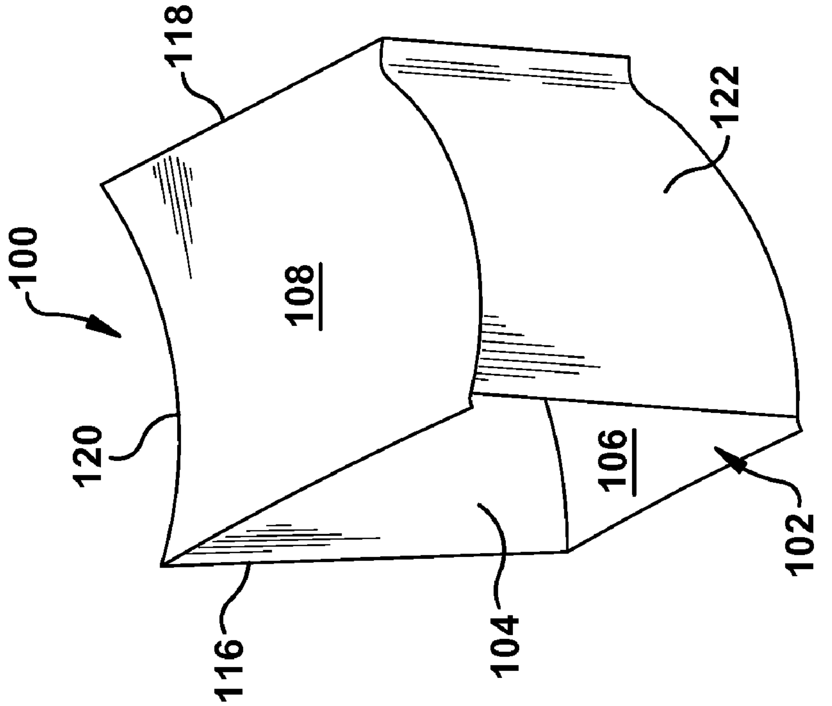

Turning to FIGS. 3-6, a nozzle 100 according to embodiments of the disclosure will now be described. As shown in FIGS. 3 and 4, nozzle 100 includes a duct member 102 mounted to a shroud 24, 26 of the turbine and having a substantially uniform wall thickness. Duct member 102 may also include at least one curvilinear inwardly facing side 104, i.e., relative to the rest of duct member 102. As will be described herein, a set of nozzles 100 is provided in a turbine about a rotating shaft 14 (FIG. 1) and replaces conventional nozzles 20 (FIG. 2). Curvilinear inwardly facing side 104 may be shaped, curved and/or sized to provide substantially the same directional focus to a fluid flow 115 (FIG. 3) (e.g., gas or steam) as an airfoil of conventional nozzles 20 (FIG. 2). In the examples shown, duct member 102 includes two opposing curvilinear inwardly facing sides 104, which may provide control over fluid flow 15 (FIG. 1). However, two opposing curvilinear sides 104 may not be necessary in all instances. The curve of each inner curvilinear side 104 may or may not have more than one curve and may or may not match an opposing inner side 104.

Figure 5:
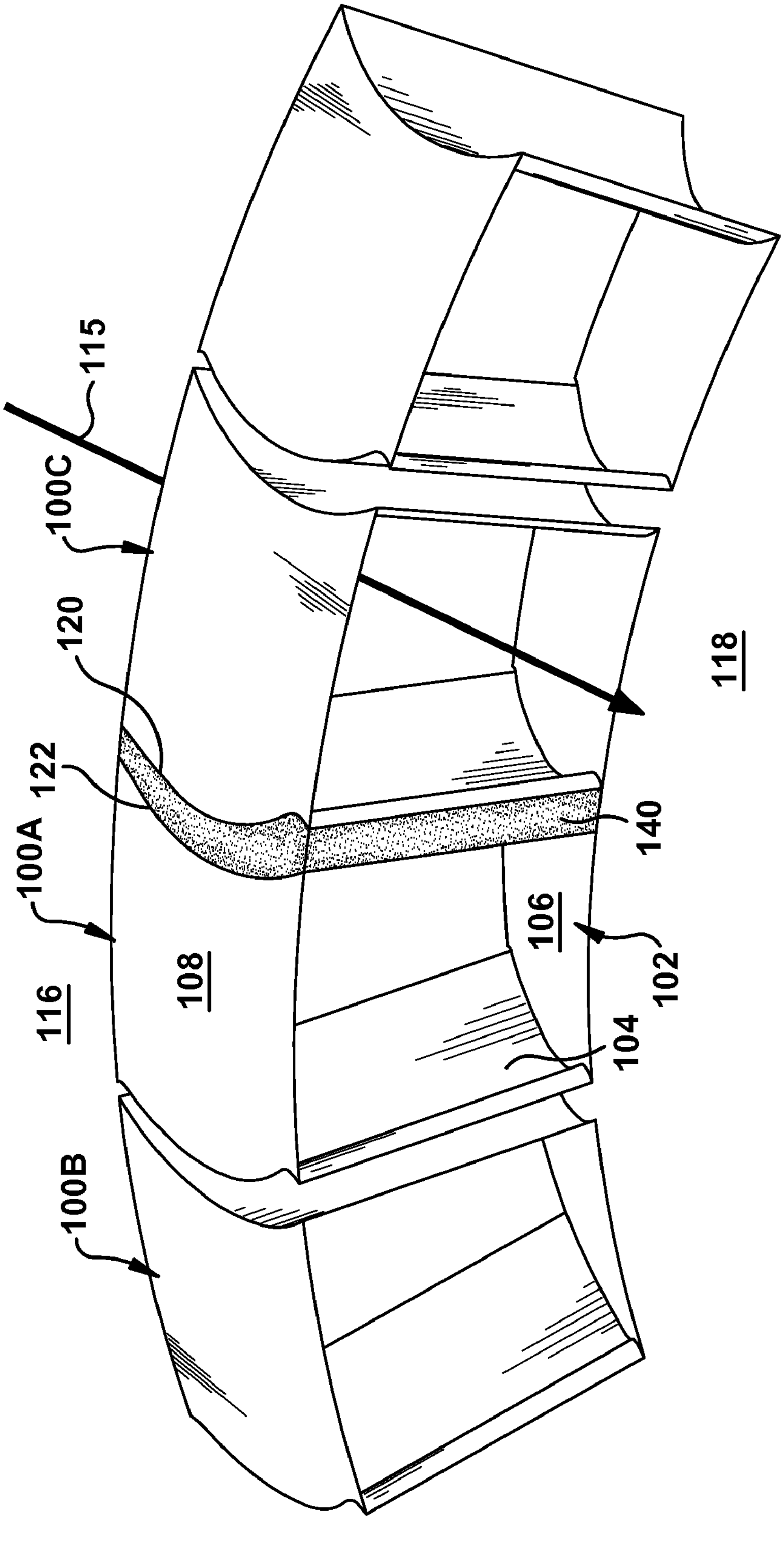
FIG. 5 shows a perspective view of a portion of a nozzle set according to embodiments of the disclosure.
Figure 6:
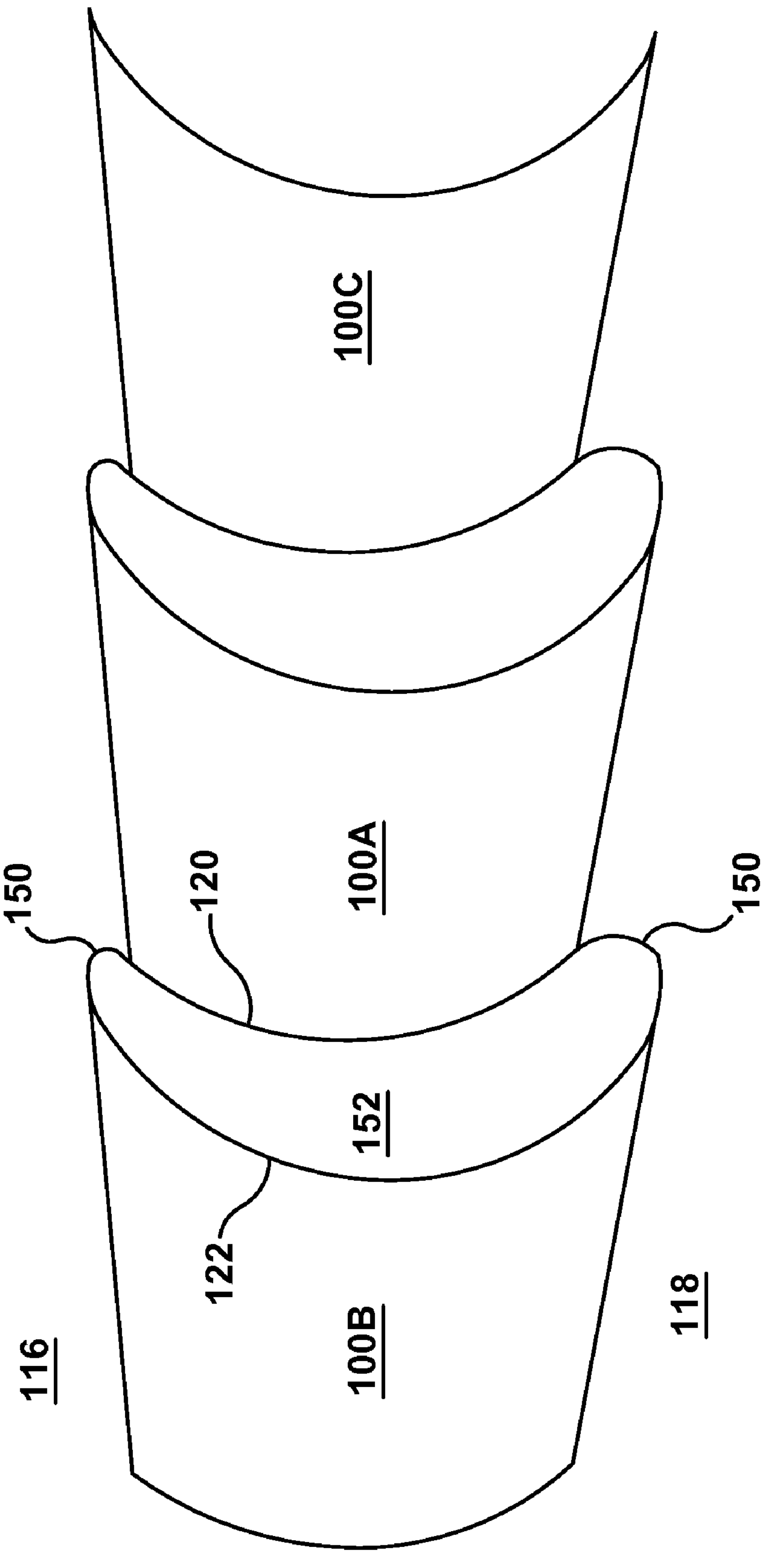
FIG. 6 shows a plan view of a portion of the nozzle set of FIG. 5.

As shown best in FIG. 5, each duct member 102 also includes a pair of opposing radially inner and radially outer (relative to rotating shaft 14 (FIG. 1)) arcuate sides 106, 108, respectively. Duct member 102, including sides 104 along with opposing arcuate sides 106, 108, provides an integral polygonal passage through which fluid flow 115 (FIG. 3) may pass in a controlled fashion. Nozzle 100 may provide a turning component to fluid flow 115 so as to create the appropriate angle of attack on buckets 16 (FIG. 1), and may provide compression or diffusion. As illustrated in FIGS. 3 and 4, nozzle 100 provides compression in that an upstream end 116 of the polygonal passage is larger (area-wise) than a downstream end 118 of the polygonal passage to aid in pressurizing fluid flow 115. As readily understandable, placing nozzle 100 in the opposite direction such that end 116 is downstream would provide diffusion to fluid flow 115.

Nozzle 100 may include a variety of different materials such as composite matrix material (CMM) or monolithic metal composition, each of which reduces costs of manufacture. CMM materials may include but are not limited to: ceramic matrix composite, metal matrix composites and organic matrix composites. Monolithic metal compositions may include but is not limited to: sheet metal, forgings formed from ingots, castings from poured metals, forgings from powder-metal compositions, or direct machine material made from rod or bar stock. In an alternative embodiment, each nozzle 100 may be formed using conventional casting technology. Further, nozzle 100 can be made out of monolithic materials or composite materials. The nozzle can be fabricated as a solid, or the final shape can be fabricated out of a set of shapes to form the final nozzle. The shape of nozzle 100 can support composite fiber winding during the fabrication process to reduce the need to use prefabricated tapes and composites laminates during the manufacturing cycle. The substantially uniform wall thickness supports higher level of non-destructive evaluation and ease of manufacture through the use of sheet materials or fiber winding.

Referring again to FIG. 5, a portion of a nozzle set as it may be positioned about rotating shaft 14 (FIG. 1) and adjacent to buckets 16 (FIG. 1) is illustrated, e.g., in a second or later stage of a multistage turbine. Each duct member 100 is mounted to stator structure (e.g., radially outer shroud 24 and radially inner shroud 26 (FIG. 1)) by the pair of opposing arcuate sides 106, 108. With reference to FIGS. 3-5, each nozzle, e.g., 100A, may include a pair of opposing outwardly facing sides 120, 122 for mating with outwardly facing sides of adjacent duct members 100B, 100C. As shown in FIG. 5 for the interface between nozzles 100A and 100B, sides 120 and 122 may include a first outwardly facing curvilinear side 120 and opposing, second outwardly facing curvilinear side 122, which may be curved differently. In this case, while sides 120, 122 are not identically curved, they are sufficiently parallel so as to allow mating without interference. In an alternative embodiment, shown for the interface between nozzles 100A and 100C, an interface member 140 may be provided for mating of the first outwardly facing curvilinear side 122 of a first duct member 100A and the opposing second outwardly facing curvilinear side 120 of an adjacent, second duct member 100C. Interface member 140 may include, for example, brackets that allow for proper positioning of each nozzle 100A, 100C, or a specially shaped block of material for mating sides 120, 122. In alternative embodiments, as shown in a plan view of FIG. 6, a cap 150 may be provided covering a gap 152 between adjacent duct members 100A, 100B, 110C. A cap 150 may be provided on an upstream 116 and/or downstream side 118 of the nozzles. Interface member 140 and cap(s) 150 may be made of the same material as duct member 102, or other suitable material.

Since nozzle 100 can be made out material other than metal such as CMM, one nozzle 100A can be made wholly out of CMM while other nozzles 100B, 100C are made wholly out of material other than CMM, e.g., metal. Consequently, testing can be carried out with less concern about machine failure because the physical characteristics are not as divergent as they would be with regular metal airfoil nozzles 20 (FIG. 2). Nozzles 100 may also be constructed including a number of materials, e.g., a CMM arcuate sides 106, 108 and metal sides 120, 122. Nozzle 100 also allows for versions of nozzle 100 made of a known, acceptable material such as metal to be placed in the field, and replacement nozzle(s) with nozzle(s) made of a different material such as CMM. In this fashion, technology upgrades can be performed without a lot of modifications. Nozzle 100 also allows for easier inspection because it does not require destruction, allows more revealing non-destructive examination techniques to be performed and can be readily modified because it is more open (may not need to dismantle turbine).

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A nozzle for a turbine, the nozzle comprising:

a duct member coupled to a shroud of the turbine and including a set of isolated walls with substantially uniform wall thickness, the set of isolated walls separated from adjacent duct members and disposed circumferentially about a shaft of the turbine; and an interface member disposed on the set of isolated walls and shaped to connect to an adjacent duct member, wherein the set of isolated walls substantially complement a set of outwardly facing sides of an adjacent nozzle and define a polygonal passage through the duct member, the polygonal passage including an upstream end and a downstream end, wherein the upstream end of the polygonal passage is larger than the downstream end of the polygonal passage.

2. The nozzle of claim 1, wherein the duct member includes a monolithic metal composition, and wherein the set of isolated walls are form an airfoil.

3. The nozzle of claim 1, wherein the duct member includes a composite matrix material.

4. The nozzle of claim 1, wherein the duct member has a single curvilinear inwardly facing side.

5. The nozzle of claim 1, wherein the duct member includes a polygonal passage and is connected to the shroud via an arcuate side.

6. The nozzle of claim 5, wherein an upstream end of the polygonal passage is larger than a downstream end of the polygonal passage.

7. The nozzle of claim 5, wherein the duct member includes a pair of opposing curvilinear inwardly facing sides and a pair of opposing arcuate sides connected to the shroud.

8. The nozzle of claim 1, wherein the duct member includes a pair of opposing outer sides for mating with outer sides of adjacent duct members.

9. The nozzle of claim 8, wherein the duct member includes a first outer curvilinear side and an opposing, second outer curvilinear side that is curved differently than the first outer curvilinear side.

10. A turbine comprising:

a shaft;

a plurality of buckets extending from the shaft; and a nozzle set adjacent to the plurality of buckets for directing a fluid flow to the plurality of buckets, each nozzle of the nozzle set including:

a duct member, the duct member including a set of isolated walls with substantially uniform wall thickness, the set of isolated walls separated from adjacent duct members and disposed circumferentially about the shaft, and an interface member disposed on the set of isolated walls and connected to at least one adjacent duct member wherein each nozzle of the nozzle set includes a set of arcuate sides connected to the turbine, and wherein a shape of the set of isolated walls in each duct member substantially complement a set of outwardly facing sides of the adjacent nozzle in the nozzle set and define a polygonal passage through the duct member.

11. The turbine of claim 10, wherein the interface member is shaped to mate outwardly facing curvilinear sides of the adjacent duct members and includes a cap covering a gap between the adjacent duct members, wherein at least one duct member includes a monolithic metal composition.

12. The turbine of claim 10, wherein at least one duct member is made wholly of a composite matrix material (CMM).

13. The turbine of claim 11, wherein the interface member includes at least one of a set of brackets or a shaped block.

14. The turbine of claim 10, wherein each duct member includes a polygonal passage having an upstream end of the polygonal passage larger than a downstream end of the polygonal passage.

15. The turbine of claim 10, wherein each duct member includes a pair of opposing curvilinear inwardly facing sides and a pair of opposing arcuate sides.

16. The turbine of claim 15, wherein each duct member is mounted to a rotor structure of the turbine by the pair of opposing arcuate sides.

17. The turbine of claim 10, wherein each duct member includes a pair of opposing outwardly facing sides for mating with outwardly facing sides of adjacent duct members.

18. The turbine of claim 17, wherein each duct member includes a first outwardly facing curvilinear side and an opposing, second outwardly facing curvilinear side that is curved differently than the first outwardly facing curvilinear side.

19. The turbine of claim 18, further comprising an interface member for mating of the first outwardly facing curvilinear side of a first duct member and the opposing second outwardly facing curvilinear side of an adjacent, second duct member.

20. The turbine of claim 17, further comprising a cap covering a gap between adjacent duct members.

* * * * *